(12) United States Patent
Rahman

(10) Patent No.: US 11,909,594 B2
(45) Date of Patent: Feb. 20, 2024

(54) PURGING IOT DEVICES IN A CELLULAR NETWORK

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 229 days.

(21) Appl. No.: 16/383,379

(22) Filed: Apr. 12, 2019

(65) Prior Publication Data

US 2020/0328943 A1 Oct. 15, 2020

(51) Int. Cl.
| | | |
|---|---|---|
| *H04L 41/12* | (2022.01) | |
| *G06F 16/23* | (2019.01) | |
| *H04L 67/12* | (2022.01) | |
| *H04L 67/30* | (2022.01) | |
| *G06N 20/10* | (2019.01) | |
| *H04W 84/04* | (2009.01) | |

(52) U.S. Cl.
CPC .......... *H04L 41/12* (2013.01); *G06F 16/2379* (2019.01); *G06N 20/10* (2019.01); *H04L 67/12* (2013.01); *H04L 67/30* (2013.01); *H04W 84/042* (2013.01)

(58) Field of Classification Search
CPC ....... H04L 67/12; H04L 67/30; H04W 84/042
USPC .......................................................... 709/223
See application file for complete search history.

(56) References Cited

U.S. PATENT DOCUMENTS

| | | | |
|---|---|---|---|
| 8,428,029 B2 * | 4/2013 | Fox ........................ | H04W 60/00 370/332 |
| 9,426,642 B1 * | 8/2016 | Sridhar .................... | H04W 8/06 |
| 2001/0022558 A1 * | 9/2001 | Karr, Jr. .................. | G01S 1/028 342/450 |
| 2011/0026484 A1 * | 2/2011 | Fox ........................ | H04W 60/00 370/331 |
| 2011/0034179 A1 * | 2/2011 | David .................... | G01S 5/0236 455/456.1 |
| 2012/0064908 A1 * | 3/2012 | Fox ..................... | H04L 12/1489 455/452.2 |
| 2012/0129517 A1 * | 5/2012 | Fox ........................ | H04W 12/12 455/425 |
| 2013/0285855 A1 * | 10/2013 | Dupray ................. | H04W 4/029 342/451 |

(Continued)

*Primary Examiner* — Mohamed A. Wasel
*Assistant Examiner* — Tesfu N Mekonen
(74) *Attorney, Agent, or Firm* — Lee & Hayes, P.C.

(57) ABSTRACT

Processes and systems for identifying and removing non-functional Internet-of-Things (IoT) devices from a cellular network are discussed herein. In one example, a probability distribution function of a data profile transmitted by a type of IoT devices is generated. The probability distribution function may be chosen based on a known distribution such as a Gaussian, Bessel, or linear regressive model. The probability distribution function may be empirically generated by applying data received from IoT devices to a machine learning model using supervised or unsupervised learning. After generating the model representing the expected data profile of data received from a type or class IoT devices, data transmitted by the IoT devices may be applied to the model to determine whether the IoT devices are functional or non-functional. Non-functional IoT devices may be removed from the cellular network.

20 Claims, 5 Drawing Sheets

(56) References Cited

U.S. PATENT DOCUMENTS

| | | | |
|---|---|---|---|
| 2015/0141013 A1* | 5/2015 | Cui | H04W 48/20 |
| | | | 455/436 |
| 2015/0373501 A1* | 12/2015 | Dribinski | H04W 4/029 |
| | | | 455/456.1 |
| 2016/0021503 A1* | 1/2016 | Tapia | G01S 5/02 |
| | | | 455/456.1 |
| 2016/0330748 A1* | 11/2016 | Bindrim | H04M 15/66 |
| 2017/0046510 A1* | 2/2017 | Chen | G06F 21/552 |
| 2017/0188281 A1* | 6/2017 | Li | H04W 36/18 |
| 2017/0325138 A1* | 11/2017 | da Silva | H04W 16/22 |
| 2018/0284735 A1* | 10/2018 | Cella | G05B 13/028 |
| 2019/0104480 A1* | 4/2019 | Hasholzner | H04W 52/34 |
| 2019/0132205 A1* | 5/2019 | Du | H04L 12/4641 |
| 2019/0147371 A1* | 5/2019 | Deo | G06N 20/00 |
| | | | 706/12 |
| 2019/0205541 A1* | 7/2019 | Zimny | H04W 4/50 |
| 2019/0261222 A1* | 8/2019 | Raleigh | H04M 15/66 |
| 2019/0285722 A1* | 9/2019 | Markhovsky | H04W 64/003 |
| 2020/0287924 A1* | 9/2020 | Zhang | G06F 16/285 |

* cited by examiner

PURGING IOT DEVICES IN A CELLULAR NETWORK

BACKGROUND

Internet-of-Things (IoT) devices may be applied to many different types of applications. For example, IoT devices may monitor and transmit data related to various parameters, including electrical usual, parking meter usage, toll tags, car sensors, among many applications. IoT devices may monitor environmental conditions or states, and may also perform control actions such as remotely controlling temperature. IoT devices may also be used as remote security monitors, door lock controllers, and appliance controllers. The number of IoT devices is expected to continue to increase in the future. This increase is expected to be driven both by the development of IoT devices and the development of cellular networks, including 5G networks. Increasing the number of IoT devices connected to networks is expected to increase the demand and load on these networks.

An IoT device connected to a cellular network may become non-functioning. A non-functioning IoT device may require cellular network services, even though the device is not functioning, which may place a burden on the cellular network.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
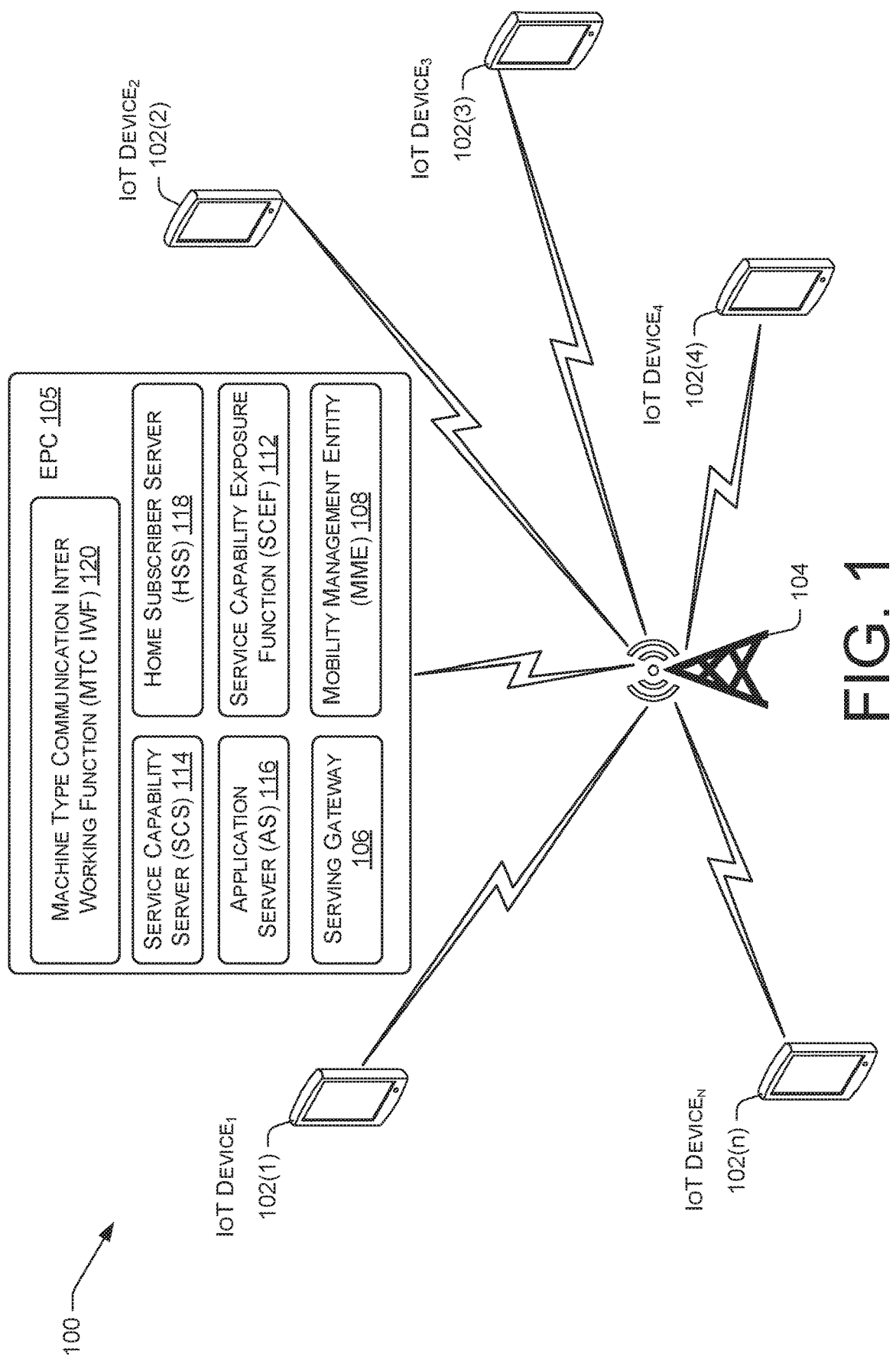
FIG. 1 is an illustrative environment depicting multiple Internet-of-Things (IoT) devices connected to a cellular network, which may include a base station and an evolved packet core (EPC) that generates and utilizes a model of IoT devices to identify and remove non-functioning IoT devices from the cellular network.

Described herein are systems and methods to identify and remove non-functioning Internet-of-Things (IoT) devices from a cellular network. The disclosed systems and methods permit the cellular network to identify, control, and remove or parse out non-functioning IoT devices from a cellular network. A non-functional device may continually attempt to register or re-register with the cellular network. Moreover, a non-functional device may continue to transmit or request data that has no meaning and may further use network resources. A non-functioning IoT device may lose connection with the cellular network and not transmit any data to the cellular network. A non-functioning device may transmit data having a low signal threshold, such that the transmitted data does not meet a quality threshold for its signal to noise ratio. A non-functioning IoT device may transmit corrupted or erroneous data. A non-functioning IoT device may fail to transmit data to the cellular network within a specified period of time. Non-functioning IoT devices connected to a cellular network needlessly utilize the resources of the cellular network.

One or more IoT devices connected to a cellular network may transmit data to the cellular network. A node within the cellular network (e.g., a node in the evolved packet core (EPC)) receives the transmitted data from one or more IoT devices. The EPC may generate a model of representing expected data from the IoT devices based on the received data. In one example, the EPC may generate a model using a machine learning approach such as a deep neural network or a Bayesian classifier. In another example, the EPC may generate the machine learning model using supervised learning approach. In an example, the machine learning model may be generated using supervised learning. In this case, labeled training data is applied to the model during a training phase to train the model. In an example, the machine learning model may be generated using unsupervised learning. Unlabeled training data may be applied to the model during a training phase to train the model. In an example, the EPC node may generate a model of the expected data based on the probability distribution function of a known data transmission model, including as statistical models such as a Gaussian (normal distribution), a Bessel function, a linear regression model, stochastic models, or frequency models such as continuous or discrete Fourier or Wavelet transforms. In an example, the model generated may represent the expected data profile of the data expected to be received from an IoT device within a class of IoT devices. For example, a class of IoT devices may represent a set of IoT devices that perform a specified operation such as a sensor operation or a control operation. In an example, the generated model may represent a distribution of data that is indicative of a Gaussian (normal distribution), a Bessel distribution, a linear regression distribution, stochastic distribution, or frequency distribution such as continuous or discrete Fourier or Wavelet transforms.

The disclosed systems and methods may be applied to applications involving a plurality of IoT devices. Example applications include industrial applications that use a large number of devices connected to a wireless network, and smart city models that use plurality of sensors. For example, street lights may periodically record and transmit measurements or readings, including temperature and traffic conditions. Each of these IoT devices may transmit data according to guidelines provided by various entities, including the network provider, the server provider, and/or the application provider. The expected transmission of data may be used to determine whether one or more IoT devices is functioning properly, and if not, may be used to purge or remove the non-functioning IoT devices from the network. In an example, the expected transmission of data may be used to create a statistical model of the data transmission of the IoT devices. The generated model may identify non-functioning IoT devices based in part on class or type associated with and IoT device. In an example, the data transmitted from a properly functioning class or type of IoT device may be expected to fall within an expected data profile of the data received from an IoT device within a class of IoT devices.

IoT devices may become non-functional for various reasons. For example, compromised software code may cause an IoT device to operate or function improperly or incorrectly. The IoT device may send data too frequently, thereby compromising the network by using network resources. The disclosed systems and methods monitor the dynamics of data transmission of IoT devices by using thresholds to identify parameters such as unwanted traffic (or communication data), too much traffic (or communication data), or no traffic (or communication data) from the IoT devices.

The threshold logic used to identify non-functioning IoT devices may be based on a reference profile or expectation of data based on standards provided by the application provider. In an example, the reference profile may be an expected data profile of data expected to be received from an IoT device. The cellular network need not wait for the application provider to identify a non-functioning device. Rather, the cellular network may identify and remove such devices based on an analysis of the statistics of data provided by the application provider and/or the IoT device.

The disclosed systems and methods model data transmissions received from IoT devices connected to a cellular network. The generated data transmission models may represent the probability distribution function of the output of IoT devices. These models may be based on known statistical or frequency models. These models may be generated using machine learning approaches. In some examples, these models may be used as a benchmark for comparison of received data from IoT devices. Advance knowledge of the expected data to be received from an IoT device may facilitate identification of received data that does not exhibit the parameters of the expected data from the model. In some examples, receiving data that deviates from the data expected based on the model may be used to identify non-functioning IoT devices. Those non-functioning devices may be removed from the cellular network.

In an example, the model may represent data received from a non-functioning IoT device rather than data expected to be received from a functioning IoT device. For example, a model may be generated to represent erroneous data transmitted by a non-functioning IoT device. The erroneous data may be transmitted in place of the data expected to be transmitted by a functioning IoT device. The erroneous data may be transmitted in addition to data expected to be transmitted by a functioning IoT device. In this example, the system may be configured to detect erroneous data transmitted by a non-functioning IoT device and to remove the non-functioning IoT device from the cellular network.

The non-functioning IoT devices may be identified and removed from the cellular network. In an example, a context of the non-functioning IoT device is removed from the cellular network. In an example, the non-functioning IoT device is unregistered from the network. The context of a non-functioning IoT device may be cleaned by a mobility management entity (MME) of the cellular network. The MME may request the base station of the radio network of the cellular network to clean the cellular network by removing the context of non-functioning devices from the cellular network. In an example, the cellular network may maintain a database storing records associated with the permissions of IoT devices. The database may contain a table or list of IoT devices that are permitted to access the cellular network. A non-functioning device may be removed from the cellular network by removing the entry in the permissions database associated with the IoT device. In an example, the database may maintain a list or table of active IoT devices. A non-functioning device may be removed from the cellular network by removing the entry in the list of active IoT devices. The databases may be maintained by different computing resources of a cellular network, including the base station and the Evolved Packet Core. The eNodeB may clean (remove) the non-functioning device from the cellular network. In another example, a third-party application server may remove the IoT context or instance from the cellular network.

FIG. 1 depicts an example environment 100 for identifying and removing non-functioning IoT devices from a cellular network. FIG. 1 depicts n number of IoT devices identified as IoT Device1 102(1), IoT Device2 102(2), IoT Device3 102(3), IoT Device4 102(4), and IoT Devicen 102(n). FIG. 1 also includes a base station 104 and evolved packet core (EPC) 105. In the case of a 5G network, the EPC may be a 5G core. The example EPC 105 shown in FIG. 1 includes various functionality including serving gateway 106, Mobility Management Entity (MME) 108, Service Capability Exposure Function (SCEF) 112, Service Capability Server (SCS) 114, Application Server (AS) 116, Home Subscriber Server (HSS) 118, and Machine Type Communication Inter Working Function (MTC IWF) 120. In some examples, the MTC IWF 120 may be referred to as Massive Machine Type Communication Inter Working Function (mMTC IWF).

Serving gateway 106 receives data packets from the base station 104 (or eNodeB or gNodeB) and routes the packets to a packet gateway. The MME 108 supports functions related to subscriber and session management, including security functionality, terminal-to network session handling, and idle terminal location management. The MME 108 may interface with the SCEF 112. The SCEF 112 provides for small data transfers and control messaging to provide a secure way to expose the services and capabilities provided by the cellular network interfaces. In one example, the SCEF 112 exposes the capability to deploy IoT devices in the cellular network. The SCS 114 connects various AS 116, including IoT Application servers, to the cellular network via MTC-IWF 120 to communicate with user equipment, including IoT devices. The AS 116 in some examples hosts the applications to be executed or interfaced with the IoT devices. The MTC IWF 120 may interface with the HSS 118 to provision or remove IoT devices from the cellular network.

Figure 2:
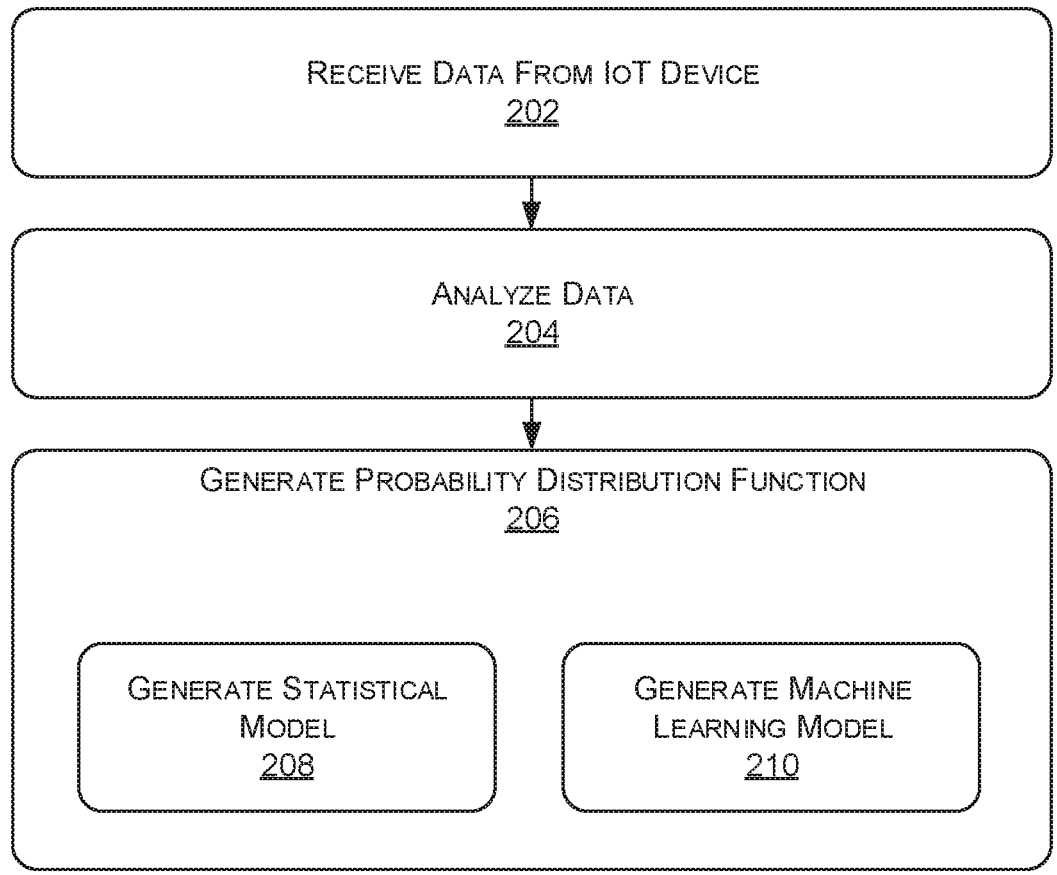
FIG. 2 illustrates an example process for generating a model representing a probability distribution function of data transmitted by a class of IoT devices.

FIG. 2 depicts an example process 200 for generating a model representing the probability distribution function of data received from IoT devices. In an example, the model represents data expected to be transmitted by a functioning IoT device. In an example, the model represents data expected to be transmitted by a non-functioning IoT device. In still a further example, the model may represent data expected to be transmitted by a functioning IoT device and data expected to be transmitted by a non-functioning IoT device.

Process 200 begins at block 202 in which data is received from a user equipment. Each user equipment (or IoT device) may transmit data having an expected distribution of data. This expected data distribution may vary, depending on whether the IoT device is functioning or non-functioning. The received data may represent data received by a non-functioning IoT device, by a functioning IoT device, or by a combination of functioning and non-functioning IoT devices. The process 200 in FIG. 2 describes an example method for generating a model of the expected output of IoT devices.

The received data may be analyzed at block 204. The analysis may include processing the data to remove or reduce noise to enhance the signal to noise ratio of the received data. For example, a moving time average may be applied to the received data to reduce high frequency variations. Other example processing may include convolutional filtering and low pass filtering. The received data may also be transformed into the frequency domain using, for example, a Fourier Transform or a Wavelet transform. In some examples, frequency information may be used to identify non-functioning IoT devices.

The received data (whether analyzed or not) may be used to generate a probability distribution function of the expected data in block 206. One type of probability distribution function assumes that the data received from an IoT device may be described by an a priori statistical model at block 208. In this example, the received data is processed to determine if the distribution of the data may be described by a statistical model such as a Gaussian (normal distribution), a Bessel function, a linear regression model, or other known statistical models. In an example, the data transmitted by a IoT device may be assumed to be described by a statistical model, rather than empirically determined. In an example, the data transmitted by the IoT device may be modeled by a stochastic model.

In an example, the probability distribution function may be generated by a machine learning model at block 210. In this case, the data received from one or more IoT devices is used as an input to a machine learning model. In an example, the inputs to the machine learning model may be data received from an IoT device. The output from the machine learning model may be a classification of an IoT device as a functioning or non-functioning IoT device. In an example, the probability distribution function of the received data may be embedded as weights or parameters of the machine learning model.

The input data may be used to train weights and parameters of the machine learning model. In an example, a supervised learning approach is used to train or adapt the weights of the model. A supervised learning approach uses data that is labeled with a known classification. Example classifications include a functioning IoT device and a non-functioning IoT device. The training data input to the machine learning algorithm may be labeled with its known classification. During training, the output of the machine learning model may be compared against the known classification of the input data to adapt the weights and parameters of the machine learning model. Once sufficient data is presented to the machine learning model during training, and the model sufficiently and correctly classifies or identifies the input data, the model is assumed to be trained.

In an example, an unsupervised learning approach may be used to train the weights or parameters of the model. During unsupervised learning, training data without classification labels is presented to the machine learning model. One example attribute of unsupervised learning approach is a self-organizing map. Another example attribute of unsupervised learning may be learning relationships between elements in data sets and classifying the raw data automatically. Upon sufficient training, the results of the unsupervised learning approach may be used to generate the machine learning model used to classify the data received from IoT devices.

In an example, the probability distribution function (generated through a statistical model or through a machine learning model) may be determined using data received from IoT devices during a fixed time interval. For example, each of these models may be generated or trained using data received during, for example, during window of length one hour. In other examples, the time window may have different lengths, including one minute, one day, one week, etc. In an example, the length of the time window may be variable and dependent on the data received from the IoT devices. Data that includes more prominent statistics may be collected from a shorter time window than data that displays more random characteristics. In an example, the probability distribution function may be updated as data is received. In this case, the machine learning model may be continually updated and adapted as additional data is received from the IoT devices.

A model may be generated for a particular type or class of IoT devices. For example, a type of IoT devices may be directed toward an application such as monitoring power meters. Another class of IoT devices may be directed toward monitoring parking meters. Another class of IoT devices may be directed toward monitoring and controlling temperature in a particular region. The disclosed systems and methods may be used to generate models for one or more types or classifications of IoT devices.

Upon successful generation of the probability distribution function model (e.g., generation of a statistical model or generation of a machine learning model), the model may be used to classify data received from IoT devices. One example classification process is shown in FIG. 3.

Figure 3:
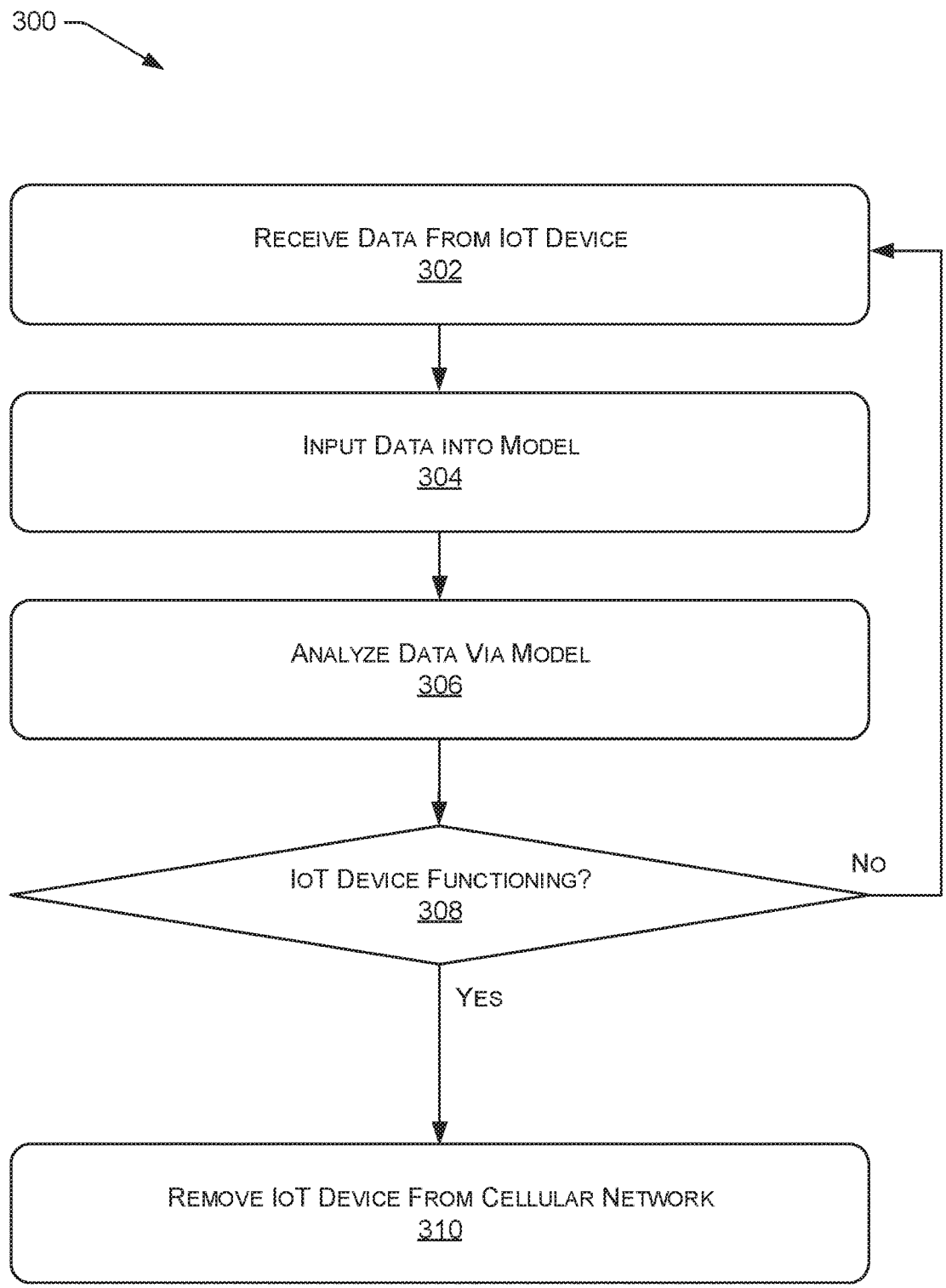
FIG. 3 illustrates an example process for removing non-functional IoT devices from a cellular network.

FIG. 3 depicts an example process that identifies (or classifies) IoT devices based on data received from those IoT devices. The IoT devices may be classified as functioning or non-functioning. A functioning IoT device is a device that is working and responding properly, whereas a non-functioning IoT device is a device that is operating erroneously, if at all. The non-functioning IoT devices may be using network resources that otherwise could be used by functioning IoT devices. To enhance network operation and performance, the non-functioning IoT devices may be removed from the cellular network.

The example process of FIG. 3 begins with receiving data from an IoT device at block 302. Example data to be received includes data that would be expected to be received from an IoT device and erroneous data received from an IoT device. Upon receiving the data, the data may be optionally processed (not shown) to enhance the signal and reduce the noise. For example, the data may be processed in the time domain, for example, by processing the amplitudes of the data. In an example, the amplitudes of the data may be averaged over a fixed or sliding time window or period. The amplitudes of the data may be applied to a low pass filter to remove high frequency noise. In an example, the amplitudes of the data may be applied to a convolutional function.

In an example, the data may be processed in the frequency domain. For example, the frequency content of the data may be processed using high pass, low pass, or bandpass filters. The frequency of the data may also be processed by applying a frequency transform such as a Fourier or Wavelet transform to identify frequency content or components of the data. The frequency content may be enhanced or filtered in the frequency domain. The processed data may be transformed back to the time domain for use in the example process of FIG. 3.

The data received from the IoT device may be input into the model at block 304. As discussed previously, the model may be a statistical model or a model generated by a machine learning approach. The model may accept as inputs the data transmitted by the IoT device. After receiving input data from a IoT device, the model may analyze the data at block 306. In one example, the model analyzes the data by applying the data to the weights or parameters of the model. Based on the input data received from the IoT device, the machine learning model may classify the IoT device as either functioning or non-functioning at block 308.

In an example, the received data may be analyzed against the expected data from the statistical model at block 306. In this example, the data may be analyzed against the expected data from the statistical model to determine whether the IoT device is functioning or non-functioning at block 308.

A IoT device that is classified or identified as non-functioning from block 308 may be removed from the cellular network at block 310. In an example, the SCEF via a S6t standard interface may query the HSS to remove the non-functioning IoT device. For example, the HSS may interface with the MME to remove the record corresponding to the non-functioning IoT device, and thereby remove the non-functioning IoT device. In an example, the HSS may remove one or more contexts associated with the non-functioning IoT devices. In one example, the context of an IoT device may be associated with a permission for that device to use the cellular network. For example, an entry in a permissions database corresponding to an IoT device may be removed, and removing the permission associated with the IoT device to access the cellular network.

In an example, the HSS may notify active nodes such as the MME in the cellular networks via the Sha interface to remove non-functioning devices. The MME may instruct the base station of the radio network to remove the non-functioning IoT devices from the network. This ensures release of network resources from different layers of the network (e.g., radio network, core network, cellular network, etc.).

In an example, an Access Mobility Function (AMF) in a 5G network may be responsible for removing non-functional IoT devices from the network. The AMF may perform functions such as registration management, connection management, reachability management, mobility management, as well as security and access management and authorization. In one example, a unified data management (UDM) may store security credentials and may remove non-functioning devices from the cellular network. In some examples, a radio network, such as a 5G network, may assign different resource attributes to connected devices that are ready to transmit and receive data. By purging some of the connected devices (also known as radio resource control (RRC) connected devices) for appropriate cases, the radio network may save resources and better accommodate other real/properly functioning devices. In some examples, the connected devices may be operating in an idle stage and the radio network may not keep context of the connected devices, which may not result in resource conservation (e.g., purging of the connected device). However, in some examples, the MME may perform resource allocation for idle connected devices by implementing intelligent purging of non-functioning IoT devices.

In an example, the base station of the radio network may clean or purge the non-functioning IoT device from its network. In some examples, a radio network may assign different resource attributes to connected devices that are ready to transmit and receive data. By purging some of the connected devices (e.g., RRC connected devices) for appropriate cases, the radio network may save resources and better accommodate other real/properly functioning devices.

Alternatively, the MME may inform the base station to clean the network. In some examples, the MME may perform resource allocation for idle connected devices by implementing intelligent purging of non-functioning IoT devices. For example, the MME may send requests to the particular base station (e.g., eNB) that is in contact with the non-functioning IoT devices as needed depending on its connection status in the preserved context. By including the removal functionality in the cellular network, the cellular network is not dependent on a third-party to remove non-functioning devices from the network.

In one example, the context of IoT devices may be included in a context database maintained by the cellular provider. The context database may include a list or table of identifiers of IoT devices that are permitted to connect to the cellular network. By removing an identifier from the table in the context database, the IoT device associated with the identifier may no longer connect to the cellular network. In another example, the context database authorizes IoT devices to connect to a cellular network. Upon removing an IoT device as an authorized device, the IoT device does not connect to the cellular network.

The network cleaning also may occur on the third-party application side. For example, the base station may request the third-party application servers to clean to remove the non-functioning devices form the cellular network. The network may be configured to clean certain devices based on their status. In an example, a third-party application server may monitor and identify non-functioning IoT devices for removal from the cellular network.

Figure 4:
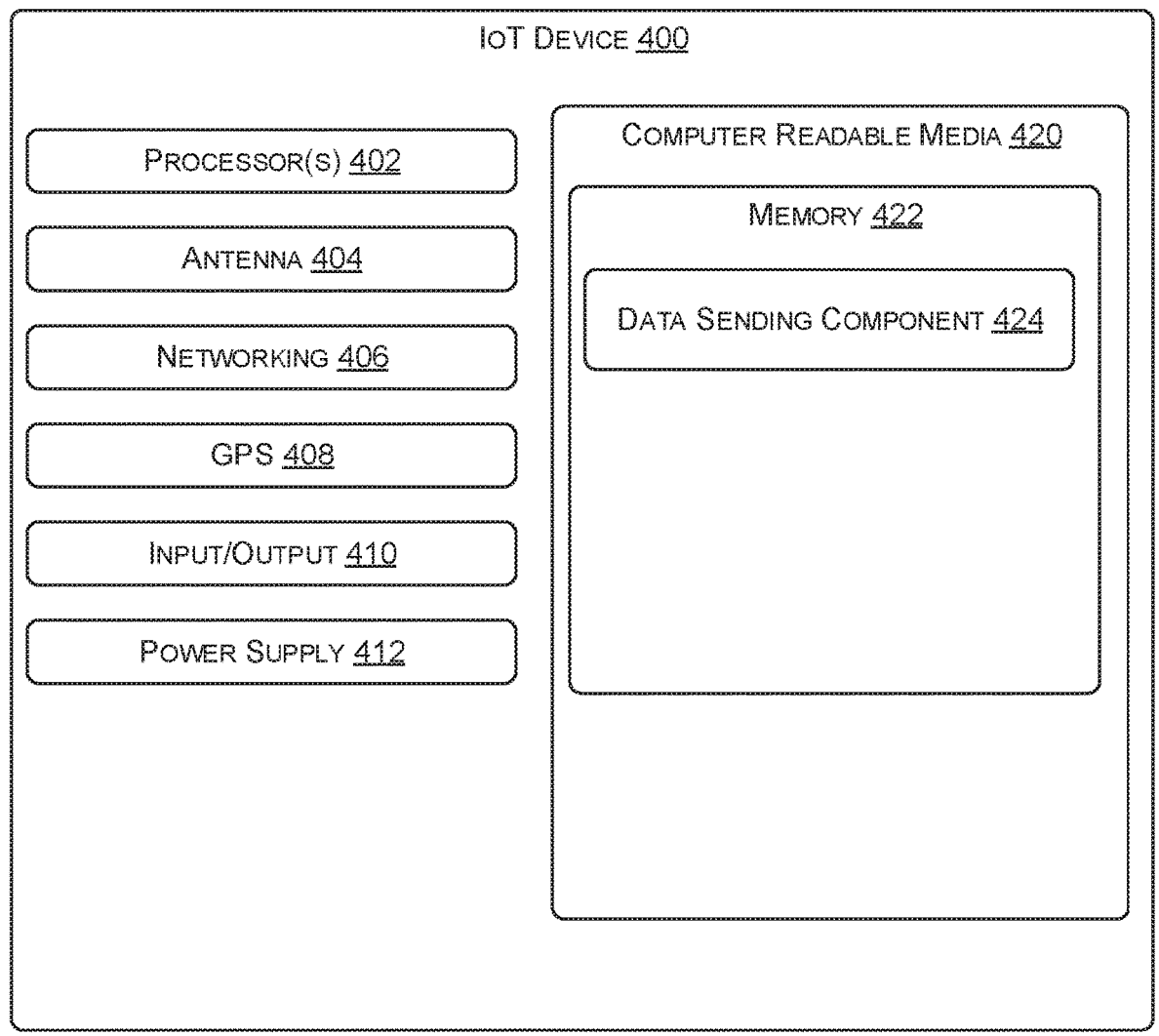
FIG. 4 illustrates example hardware and software for an IoT device according to the disclosed systems and methods.

FIG. 4 illustrates an example IoT device for use with the disclosed systems and methods. In this example, the IoT device 400 includes a processor 402, an antenna 404, networking component 406, GPS 408, input/output ports 410, power supply 412, and a computer readable media 420. The computer readable media 420 includes a memory 422 that stores instructions for sending data to a EPC.

The IoT device 400 includes one or more processors 402. Processor(s) 402 may be any type of processors, including a central processing unit (CPU), a graphics processing unit (GPU), or both CPU and GPU, or other processing unit or component known in the art.

The antenna 404 provides radio frequency (RF) communications with a licensed cellular network, such as a 5G/NR network, an LTE network, a UTMS network, or a GSM network. The networking component 406 may include ports and modules for communicating with the outside world. The networking component 406 includes transceiver ports for local area networks (LANs) and wide area networks (WANs). In one example, the LAN and/or WAN ports provide a wired connection to the Internet. The networking component 406 may also include a wireless communications module that includes one or more wireless transceivers to wirelessly transmit and receive data. For example, the transceivers can include a network interface card (NIC), a network adapter, a LAN adapter, or a physical, virtual, or logical address to connect to various network(s), for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers are not limited to 802.11 ac, but may include one or more modems for engaging in IEEE 802.11-based technologies, IEEE 802.15-based technologies and its progeny (e.g., Zigbee, Bluetooth, Low-Rate Wireless Personal Area Networks, Wireless HART, MiWi), IEEE 806.15-based technologies (WiMAX), WLAN, near-field communications, and infrared communications.

The GPS 408 provides global positioning data for the IoT device. Input/output (I/O) ports 410 provide interfacing with the external environment. The I/O ports may include USB, serial, parallel, HDMI, display ports, digital video interface (DVI), Ethernet, and any other ports known to a person of ordinary skill in the art. These input/out ports may collectively be referred to as I/O 410. The I/O ports interface with device(s), such as a keypad, a cursor control, a touch-sensitive display, voice input device, etc., a display, speakers, printers, etc. These ports are well known in the art and need not be discussed at length here.

The IoT device 400 also includes power supply 412 for providing AC and/or DC power for the IoT device. In an example, the power supply 412 is a battery. In an example, the power supply 412 includes an AC adaptor or a DC adaptor with a backup power supply such as a backup battery.

The IoT device 400 includes computer-readable media 420. As an example, the computer-readable media 420 includes memory 422 (or other storage components) for storing computer executable instructions that perform the disclosed systems and methods. Computer readable media may include any type of memory or storage media for a processor, including RAM, ROM, firmware, flash memory, EEPROM, or other types of memory known to one of ordinary skill in the art. One component of computer readable media 420 is a component to send data to a EPC. The data may be test data. In an example, the data may be data generated or monitored by the IoT device. Tangible computer-readable media can include volatile and nonvolatile, removable and non-removable media implemented in any method or technology for storage of information, such as computer readable instructions, data structures, program modules, or other data. In an example, computer readable media may include hard disk drives for storing the instructions for the data sending component 424. Other computer readable media may include magnetic disks, optical disks, or tape, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the IoT device 400. Any such tangible computer-readable media may be included in IoT device 400.

Figure 5:
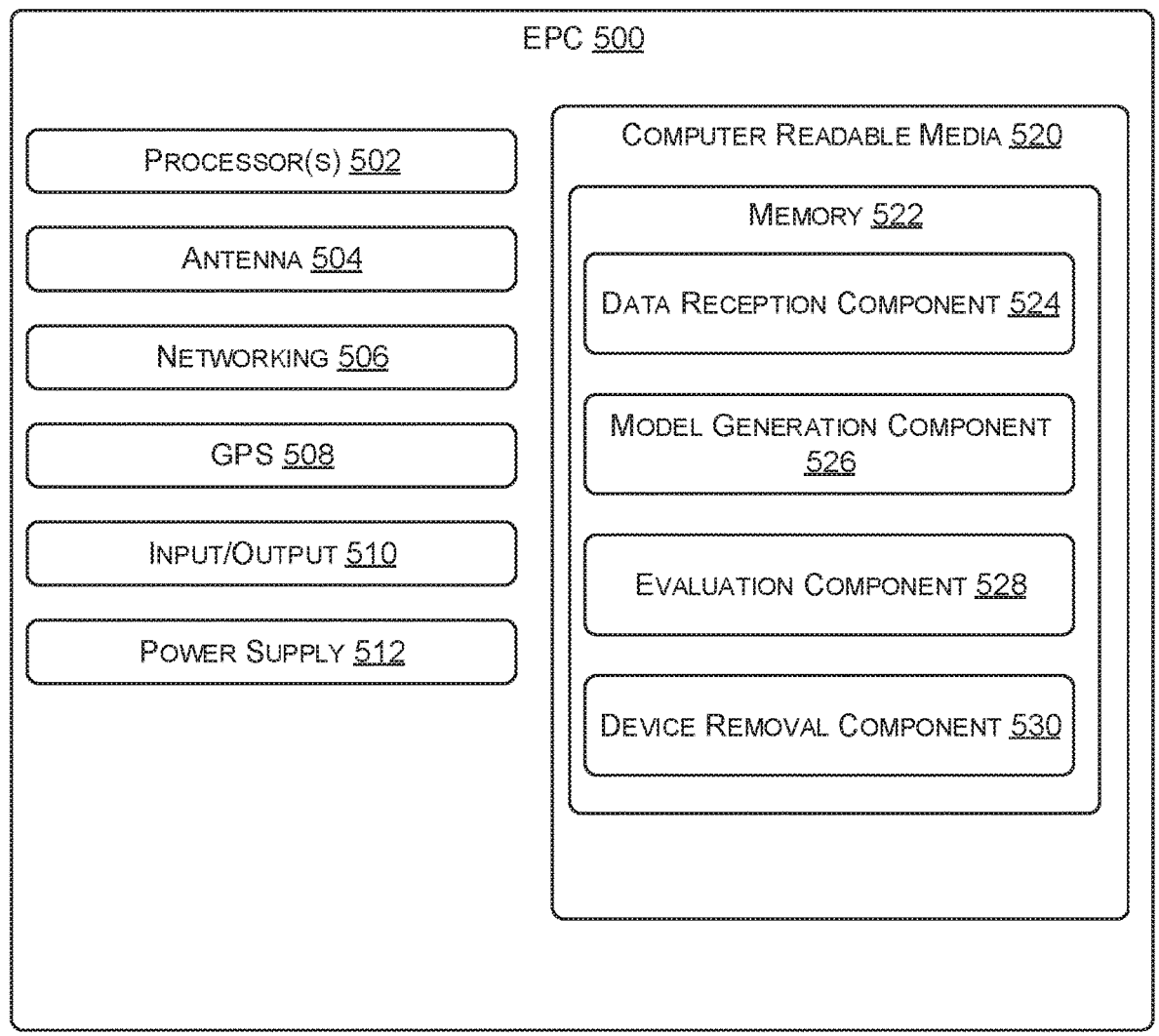
FIG. 5 illustrates example hardware and software for an evolved packet core (EPC) node according to the disclosed systems and methods.

FIG. 5 depicts example hardware and software of an example EPC node 500.

The EPC node 500 includes one or more processors 502 and a computer readable media 520. The computer readable media 520 includes memory 522. Memory 522 stores computer instructions that when executed cause the one or more processors of the EPC node 500 to perform various operations for generation of the model of IoT devices and for identification and removal of non-functioning IoT devices. The example shown in FIG. 5 includes a data reception component 524, a model generation component 526, an evaluation component 528, and device removal component 530.

Example computer readable media 520 include RAM, ROM, firmware, flash memory, EEPROM, or other types of memory storage known to one of ordinary skill in the art. Tangible computer-readable media may include volatile and nonvolatile, removable and non-removable media implemented in any method or technology for storage of information, such as computer readable instructions, data structures, program components, or other data. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 502 of the EPC node 500. Any such tangible computer-readable media can be part of the EPC node 500.

Data reception component 524 includes computer instructions that when executed by one or more processors receives data from IoT devices.

Model generation component 526 includes computer instructions that when executed by one or more processors generates a model for the probability distribution function of IoT devices. The models may be based on statistical models or on machine learning models.

Evaluation component 528 includes computer instructions that when executed by one or more processors determine whether a particular IoT device is non-functioning or not. In an example, data received from a IoT device is input into the model (from generation component 526) to determine if the IoT device is functioning. The output of the model may indicate the classification of a IoT device as functioning or non-functioning. In an example, the data may be compared against a statistical model to determine whether a IoT device is non-functioning.

Device removal component 530 includes computer instructions that when executed by one or more processors removes non-functioning devices from the cellular network. As discussed previously, the non-functioning devices may be identified by the SCEF, which transmits a message to the HSS to remove the IoT device. The HSS may also transmit a message to the base station indicating that the base station should clean the cellular network by removing the non-functioning IoT device.

The EPC node 500 may include networking component 506 for providing ports and components for communicating with the other elements of the system such as that shown in FIG. 1. The networking component 506 may include transceiver ports for local area networks (LANs) and wide area networks (WANs). In one example, the LAN and/or WAN ports provide a wired connection to an Intranet and/or Internet. The networking component may also provide connections to other components of the carrier's base station, as well as to the back-end system of the carrier. The networking component 506 may also include a wireless communications component that includes one or more wireless transceivers. For example, the transceivers can include a network interface card (NIC), a network adapter, a LAN adapter, or a physical, virtual, or logical address to connect to various network(s), or to the back-end system of the carrier's network, for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method for removing a non-functioning Internet-of-Things (IoT) device from a cellular network, comprising:

receiving, as training data, first data from first one or more IoT devices, the training data being collected over a time interval, including, after receiving a first portion of the training data:
    determining, during the time interval, characteristics of the first portion of the training data collected over the time interval; and
    determining, during the time interval, a length of the time interval over which the training data is collected based at least in part on the characteristics of the first portion of the training data, wherein at least a second portion of the training data is received during a remainder of the time interval after the determining of the length of the time interval based at least in part on the characteristics of the first portion of the training data;
generating, based at least in part on the training data, a model representing an expected data profile to be transmitted to the cellular network from second one or more IoT devices;
receiving, as received data, second data from an IoT device;
comparing the received data from the IoT device to the model representing the expected data profile to be transmitted to identify the IoT device as the non-functioning IoT device; and
removing, based at least in part on comparing the received data to the model representing the expected data profile to be transmitted, the non-functioning IoT device from the cellular network.

2. The method of claim 1, wherein the model represents a plurality of classes of IoT devices, and wherein the method further comprises:
    determining a class of the plurality of classes associated with the IoT device; and
    wherein removing the non-functioning IoT device from the cellular network is further based in part on the class associated with the IoT device.

3. The method of claim 1, wherein generating the model includes:
    processing the received data in a time domain or in a frequency domain, wherein processing the received data in a time domain includes processing one or more amplitudes of the received data and processing in the frequency domain includes processing a frequency content of the received data.

4. The method of claim 1, wherein generating the model includes:
    receiving additional training data from the first one or more IoT devices over a fixed time interval; and
    updating the model based in part on the additional training data.

5. The method of claim 1, wherein generating the model includes:
    receiving additional training data from a non-functioning IoT device; and
    updating the model based in part on the additional training data, wherein the model represents a data profile transmitted by a non-functioning IoT device.

6. The method of claim 1, wherein generating includes:
    receiving additional data from the first one or more IoT devices; and
    updating the model based on the additional data.

7. The method of claim 1, further comprising:
    receiving an indication of a statistical representation of data expected to be transmitted by the IoT device; and
    wherein generating the model includes configuring the model based on the indication of the statistical representation of the data expected to be transmitted by the IoT device.

8. The method of claim 1, wherein the model represents a distribution of data that is indicative of a Gaussian distribution, a Bessel distribution, a linear distribution, or a stochastic distribution.

9. The method of claim 1, wherein the model is generated based on a machine learning algorithm.

10. The method of claim 1, wherein the model is generated based on supervised learning or unsupervised learning.

11. The method of claim 1, wherein the non-functioning IoT device (1) transmits data with a signal to noise ratio below a threshold, (2) transmits corrupted data, or (3) fails to transmit data within a period of time.

12. The method of claim 1, wherein removing includes removing a permission associated with the IoT device, the permission allowing the IoT device to access the cellular network.

13. The method of claim 1, wherein removing includes removing an identifier of the IoT device from a record in a database, the database identifying an IoT device is capable of accessing a cellular network.

14. A system for removing non-functioning Internet-of-Things (IoT) devices from a cellular network, the system comprising:
    one or more processors; and
    a memory storing computer instructions that when executed cause the one or more processors to perform acts comprising:
    receiving, as training data, first data from first one or more IoT devices, the training data being collected over a time interval, including, after receiving a first portion of the training data:
        determining, during the time interval, characteristics of the first portion of the training data collected over the time interval; and
        determining, during the time interval, a length of the time interval over which the training data is collected based at least in part on the characteristics of the first portion of the training data, wherein at least a second portion of the training data is received during a remainder of the time interval after the determining of the length of the time interval based at least in part on the characteristics of the first portion of the training data;
    generating, based at least in part on the training data, a model representing an expected data profile to be transmitted to the cellular network by second one or more IoT devices;
    receiving, as received data, second data from an IoT device;
    comparing the received data from the IoT device to the model representing the expected data profile to be transmitted to identify the IoT device as a non-functioning IoT device; and
    removing, based at least in part on comparing the received data to the model representing the expected data profile to be transmitted, the non-functioning IoT device from the cellular network.

15. The system of claim 14, wherein the model represents the expected data profile of a class of IoT devices.

16. The system of claim 14, the acts further comprising:
    receiving the received data from a type of IoT devices; and processing the received data in a time domain or in a frequency domain, wherein processing the received data in a time domain includes processing one or more amplitudes of the received data and processing in the frequency domain includes processing a frequency content of the received data.

17. The system of claim 14, the acts further comprising:
receiving additional training data from the first one or more IoT devices; and
updating the model based on the additional training data.

18. The system of claim 14, wherein the model represents a distribution of data that is indicative of a Gaussian distribution, a Bessel distribution, a linear distribution, or a stochastic distribution.

19. A non-transitory computer-readable media for removing non-functioning Internet-of-Things (loT) devices from a cellular network, the non-transitory computer-readable media including instructions that when executed by a processor, cause a node in the cellular network to perform acts comprising:
receiving, as training data, first data from first one or more IoT devices, the training data being collected over a time interval, including, after receiving a first portion of the training data:
determining, during the time interval, characteristics of the first portion of the training data collected over the time interval; and
determining, during the time interval, a length of the time interval over which the training data is collected based at least in part on the characteristics of the first portion of the training data, wherein at least a second portion of the training data is received during a remainder of the time interval after the determining of the length of the time interval based at least in part on the characteristics of the first portion of the training data;
generating, based at least in part on the training data, a model representing an expected data profile to be transmitted to the cellular network by second one or more IoT devices;
receiving, as received data, second data from an IoT device;
comparing the received data from the IoT device to the model representing the expected data profile to be transmitted to identify the IoT device as a non-functioning IoT device; and
removing, based at least in part on comparing the received data to the model representing the expected data profile to be transmitted, the non-functioning IoT device from the cellular network.

20. The non-transitory computer-readable media of claim 19, wherein the model represents an (1) an indication of a statistical representation of data expected to be transmitted by the IoT device, (2) a Gaussian distribution, (3) a Bessel distribution, (4) a linear regression distribution, (5) a stochastic distribution, or (6) a machine learning algorithm.

* * * * *